United States Patent [19]
Ramunas

[11] Patent Number: 4,710,077
[45] Date of Patent: Dec. 1, 1987

[54] LOCKING TOOL HOLDER

[75] Inventor: Valdas S. Ramunas, Euclid, Ohio

[73] Assignee: Erickson Tool Company, Solon, Ohio

[21] Appl. No.: 762,255

[22] Filed: Aug. 5, 1985

[51] Int. Cl.$^4$ .............................................. B23C 5/26
[52] U.S. Cl. .................................... 409/232; 279/79; 408/239 R
[58] Field of Search ...................... 279/1 F, 76, 79, 87, 279/97, 1 DA, 1 TE, 86, 19.5; 408/238, 239 R, 714; 409/234, 231, 232; 29/568; 211/1.5

[56] References Cited

U.S. PATENT DOCUMENTS

| | | | |
|---|---|---|---|
| 2,107,581 | 2/1938 | Parsons et al. | 279/76 |
| 2,136,190 | 11/1938 | Gulfelt | 279/76 |
| 2,154,738 | 4/1939 | Fisher | 279/76 |
| 2,500,420 | 3/1950 | Koning . | |
| 2,990,189 | 1/1961 | Beers | 279/76 |
| 3,091,474 | 5/1963 | Boutros et al. | 279/97 |
| 3,947,951 | 4/1976 | Jerue | 29/568 |

*Primary Examiner*—Z. R. Bilinsky
*Attorney, Agent, or Firm*—Pearne, Gordon, McCoy & Granger

[57] ABSTRACT

A locking tool holder is disclosed which has a socket adapted to receive a tool which has a lateral recess. The tool holder contains a lock pin which is slidable in a first aperture transverse to the tool socket, and this lock pin has a wedge portion on the inboard end thereof to engage a tapered lateral recess on the tool. A cam bar is slidable transversely to the lock pin in another aperture in the tool holder, and has first and second cam surfaces to cooperate with first and second cam followers on the lock pin. The cam bar may be moved manually or by a spring into a first locked position, whereat the second cam engages the second cam follower on the lock pin to force the lock pin wedge portion against the lateral recess in the tool. When the cam bar is moved into the second position, the first cam surface engages the first cam follower on the lock pin to withdraw the lock pin from the tool so that the tool may be removed from the tool socket. The foregoing abstract is merely a resume of one general application, is not a complete discussion of all principles of operation or applications, and is not to be construed as a limitation on the scope of the claimed subject matter.

13 Claims, 5 Drawing Figures

LOCKING TOOL HOLDER

BACKGROUND OF THE INVENTION

Many different forms have been proposed for a tool holder which will accept a tool or tool adapter in a socket and lock it in place. U.S. Pat. No. 2,107,581 suggests a construction wherein a spring-urged wedge moves a detent laterally toward engagement with a tool and a socket, with the tool capable of being pulled out of the socket when the wedge is released. U.S. Pat. No. 2,136,190 proposes a screw which acts on a detent member to force it into engagement with a tool in the socket, and the detent is spring-urged toward disengagement. U.S. Pat. No. 2,500,420 shows a screw which acts to move a pawl laterally into engagement with a punch in a socket. A difficulty with the latter two patent constructions is that the machinery is often subject to vibration and jarring, which can loosen the screw and cause the tool to come out of the socket, with perhaps disastrous results. In all of these constructions, a pull on the tool will remove it from the socket when the detent is not in the engaged position, because in none of these is there any positive locking action.

SUMMARY OF THE INVENTION

The problem to be solved, therefore, is how to construct a locking tool holder which will provide positive locking of a tool within the tool socket.

This problem is solved by a locking tool holder having a socket and adapted to receive a tool having a lateral recess therein, said locking tool socket comprising in combination a first aperture in the tool socket extending transversely to the axis of the tool socket, a lock pin movable in said first aperture, said lock pin adapted to cooperate with and be lockably complementary to the lateral recess on a tool in the tool socket, a second aperture in said tool socket intersecting said first aperture transversely thereto, a cam bar slidable in said second aperture, a cam surface on said cam bar cooperable with a cam follower surface carried on said lock pin, said cam bar being movable in opposite directions in said second aperture into first and second positions, and movement of said cam bar to said first position establishing said lock pin in wedging engagement with the lateral recess on a tool to lock the tool in the tool socket, and movement of said cam bar towards said second position causing said cam surface to act on said cam follower surface to force said lock pin transversely outwardly to unlock a tool in the tool socket.

Accordingly, an object of the invention is to provide a lock pin acting on a tool in a socket and a cam bar acting on the lock pin.

Another object of the invention is to provide a lock pin with a wedging action on a tool in a socket for positive locking engagement.

A further object of the invention is to provide a locking tool holder wherein a lock pin secures a tool in a socket and a cam bar has a cam to force the lock pin outwardly to unlock the tool in the tool socket.

Other objects and a fuller understanding of the invention may be had by referring to the following description and claims, taken in conjunction with the accompanying drawing.

DESCRIPTION OF THE PREFERRED EMBODIMENTS

Figure 1:
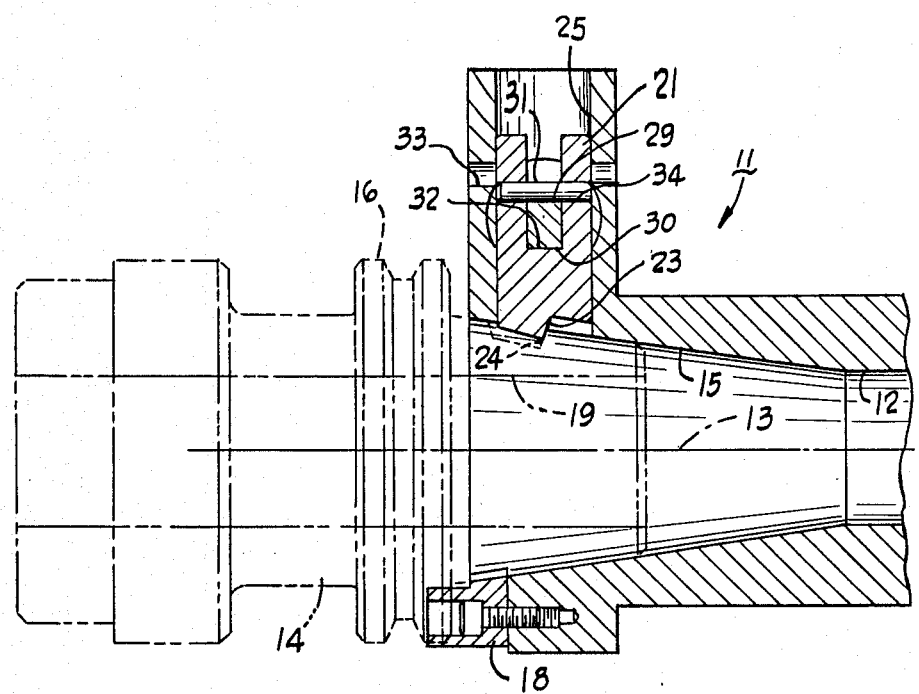
FIG. 1 is a longitudinal, sectional view of a locking tool holder embodying the invention.
Figure 2:
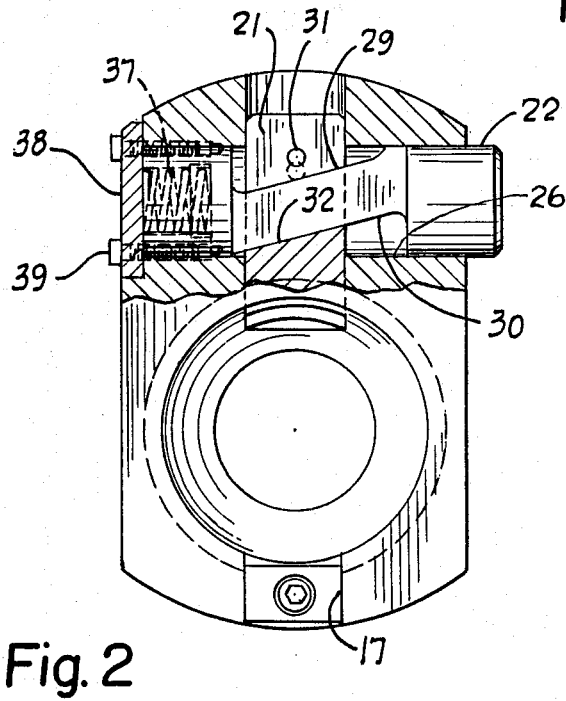
FIG. 2 is an end view of the tool holder of FIG. 1, with the tool removed.

FIGS. 1 and 2 illustrate a locking tool holder 11 which has a central aperture 12 and an axis 13. The tool holder 11 is shaped to receive a tool or tool adapter 14, and may have a cylindrical aperture for this purpose but, as shown, is one which has a conical socket 15 to receive the male conical tool or tool adapter 14. Many machine tools today utilize mechanical tool changers and, for this purpose, the tool adapter 14 may include a grooved collar 16 to accept the gripping tongs of the mechanical tool changer. The collar may have a keyway 17 to receive a key 18 in the locking tool holder 11 to ensure proper orientation of the tool 14 in the socket 15. The tool adapter 14 may have a central aperture 19 for coolant or the like to cooperate with the central aperture 12 of the socket.

The locking tool holder includes generally a lock pin 21 and a cam bar 22. The lock pin 21 has a wedge portion 23 which is moved by the lock pin 21 and, in this construction, is on the inner end of the lock pin 21. This wedge portion is adapted to cooperate with and be complementary to a lateral recess 24 formed in the conical surface of the tool adapter 14. The lock pin 21 is, in this embodiment, circular in cross section, and is slidably disposed in a first aperture 25, which is transverse to the tool socket 15. Also in this preferred embodiment, it will be noted that the axis of the first aperture 25 is perpendicular to the axis 13 of the tool socket. A second aperture 26 is transverse to the first aperture 25, and the cam bar 22 is longitudinally slidable in this second aperture. In this embodiment, the axes of the first and second apertures are perpendicular to each other, and also the axis of the second aperture is in a plane normal to the axis 13 of the tool socket. The cam bar 22 has first and second cam surfaces 29 and 30 thereon cooperating with first and second cam follower surfaces 31 and 32, respectively, on the lock pin 21. The second cam follower surface 32 is formed by a slot cut in the lock pin 21, and the first cam follower surface 29 is formed by a roll pin or dowel pin passed through an aperture 33 in the holder 11 into an aperture 34 in the lock pin 21.

A compression spring 37 urges the cam bar into a first position shown in FIG. 2, and this spring is held by a retainer plate 38 and screws 39. A first retention means retains the lock pin 21 in place in the first aperture 25, and this first retention means includes the first and second cam surfaces 29 and 30 on the cam bar 22. Because of these cam surfaces, the lock pin 21 is trapped in the first aperture 25. A second retention means is provided to retain the cam bar 22 in the second aperture 26, and this includes the first and second cam follower surfaces 31 and 32, which trap this cam bar within the second aperture 26.

The locking tool holder has few parts, and may be simply manufactured and assembled. The first and second apertures 25 and 26 are cylindrical apertures which may be simply drilled or bored in the tool holder 11. The lock pin 21 is cylindrical for a slide bearing within the first aperture 25, and contains the milled slot which receives the cam bar 22. A hole is drilled transversely in this lock pin to receive the first cam follower 31, which is a dowel pin or roll pin. The cam bar 22 is also a cylindrical member, and the intermediate portion is machined, e.g., by milling, to create the flat sides and the cam surfaces 29 and 30. The wedge portion 23 on the lock pin is formed at the proper angle, e.g., 15 degrees, by milling or other machining. The assembly of the locking tool holder 1 is performed by inserting the lock pin 21 into the exterior end of the first aperture 25 and dropping it into the conical socket 15 far enough so that the cam bar 22 can be inserted. The lock pin 21 is then moved transversely outwardly until the second cam follower 32 engages the second cam surface 30. When the cam bar 22 is moved to the right, as viewed in FIG. 2, the lock pin 21 may be moved laterally outwardly to a position whereat the dowel pin cam follower 31 may be inserted through the holder aperture 33 into the lock pin aperture 34. The compression spring 37 and retainer plate 38 may then be put in place at the left end of the cam bar, as viewed in FIG. 2.

In operation, the tool or tool adapter 14 may be inserted into the conical socket 15 with which it is complementary. This insertion may be done manually, or may be done by a tool changer, in either case observing the proper orientation of the tool adapter so that the key 18 will be received in the keyway 17. To permit this insertion, the cam bar 22 is first moved from the first position shown in FIG. 2 to a second position to the left, which will compress the spring 37. this will act through the first cam surface 29 and first cam follower 31 to retract the lock pin 21. When the tool 14 is properly inserted, the cam bar 22 may be released, and the spring 37 will urge it to the right as viewed in FIG. 2, namely, into the first position. This will act through the second cam surface 30 and second cam follower 32 to force the lock pin laterally inwardly, and wedgingly lock the tool 14 in the conical socket 15. In the preferred embodiment, the cam surfaces 29 and 30 are at about a 15-degree angle, as is the wedge portion 23 relative to a perpendicular to the axis 13. These two 15-degree angled cams or wedges acting in series effectively lock the tool 14 in the socket, even though the single 15-degree wedge may not be considered a locking wedge. In this case, the two movable parts, the lock pin 21 and the cam bar 22, move at right angles to each other, and the combined action of the two 15-degree wedges provides a positive locking engagement to the tool so that it is not dislodged by any vibration or shocks in the machine tool with which this locking tool holder may be used.

Figure 3:
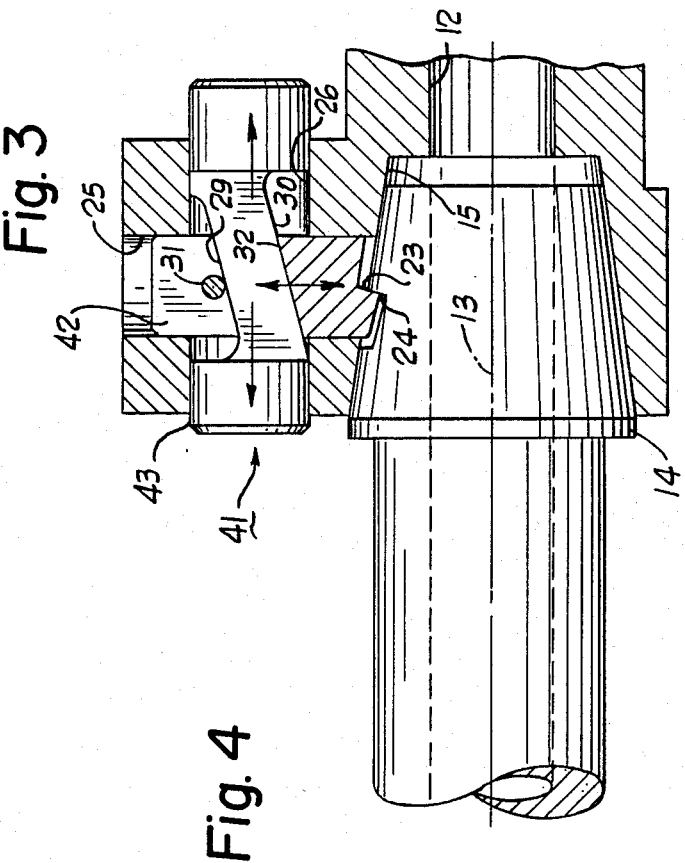
FIG. 3 is a longitudinal, sectional view of a modification of the invention.
Figure 5:
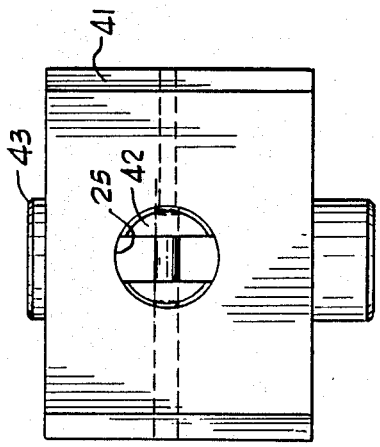
FIG. 5 is a side view of the tool holder of FIGS. 3 and 4.
Figure 4:
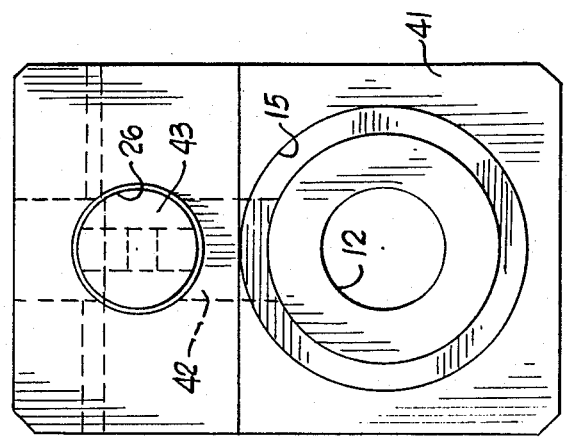
FIG. 4 is a front view of the tool holder of FIG. 3, with the tool removed.

FIGS. 3, 4, and 5 illustrate a second embodiment of the invention of a locking tool holder 41. This tool socket again has a socket of suitable dimensions and shape to receive a tool 14 and, as shown, this includes the conical socket 15 for the complementary shape of a cone on the tool 14. FIGS. 4 and 5 show the tool holder with the tool removed, and FIG. 3 shows it with the tool in place. The locking tool holder 41 includes a lock pin 42 and a cam bar 43, which are quite similar to those parts shown in the embodiment of FIGS. 1 and 2. The lock pin 42 is slidable in the first aperture 25, which in this embodiment is perpendicular to the axis 13 of the tool socket. The cam bar 43 is slidable in the second aperture 26, which is transverse to and intersects the first aperture 25, and in this embodiment is perpendicular to the axis of the first aperture 25. In this embodiment, as distinguished from that in FIGS. 1 and 2, the second aperture 26 is perpendicular to the axis of the first aperture 25, and is also parallel to the axis 13.

The lock pin 42 is quite similar to the lock pin 21, except that the wedge portion 23 is at right angles to the first and second cam follower surfaces 31 and 32. The cam bar 43 is similar to the cam bar 22, except that this is manually urged in both directions rather than being spring-urged into the first or locked position of the cam bar. The first and second cam surfaces 29 and 30 are the same as in the first embodiment. It has been found that once the cam bar 43 is moved into the locked position, as shown in FIG. 3, the tool 14 is securely wedged or locked in the socket despite vibration or physical shocks to this locking tool holder 41, and this, despite the fact that the angles of the cam surfaces 29 and 30 and of the wedge portion 23 are each at about a 15-degree angle. Again, it is considered that the two 15-degree angle wedging actions in series provide an effective lock against movement of the tool 14 in the socket 15, yet it may be quickly released by movement of the cam bar 43 to the second position. This may be manual, as shown in FIGS. 3, 4, and 5, or may be pneumatic or hydraulic actuation.

The locking tool holder 41 of the embodiments of FIGS. 3, 4, and 5 may be operated in a manner similar to that of FIGS. 1 and 2. FIG. 3 shows the cam bar 43 moved to the right into the first or locked position. If the cam bar 43 is moved to the left into a second opposite position, the cam surface 29 coacts with the cam follower surface 31 to withdraw the lock pin 42, and hence release the tool 14 from the locking tool holder 41. When next another tool is inserted in the socket, the cam bar 43 may be moved back towards the right, and then the cam surface 30 coacts with the cam follower surface 32 to force the lock pin into wedging, locking engagement with the tool. Again in the embodiment, it will be noted that the tool has a lateral recess 24 which is a tranverse tapering surface complementary to the wedge portion of the lock pin 42 and extends at a slight angle relative to a plane normal to the axis 13 of the socket. Also, it will be noted that in both embodiments the cam bar 43 is generally cylindrical of a given diameter, and the distance between the cam surfaces 29 and 30 is a distance less than this given diameter. Accordingly, the cam follower surfaces 31 and 32, riding on these cam surfaces 29 and 30, provide the retention means to retain the cam bar 43 within the second aperture 26. The cam surfaces 29 and 30 are formed on a flat, intermediate portion of the cam bar 43, and this flat portion fits within the slot in the lock pin 42, which prevents rotation of the lock pin 42. This ensures that the wedge portion 23 will always be in the proper orientation to mate with the tapered lateral recess 24 in the tool 14. The locking tool holder 11 or 41 of the invention permits a large central aperture 19, so that coolant may readily be supplied through the shank of the socket into the tool adapter, which may be adapted to mount various kinds and sizes of tools in a machine tool.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

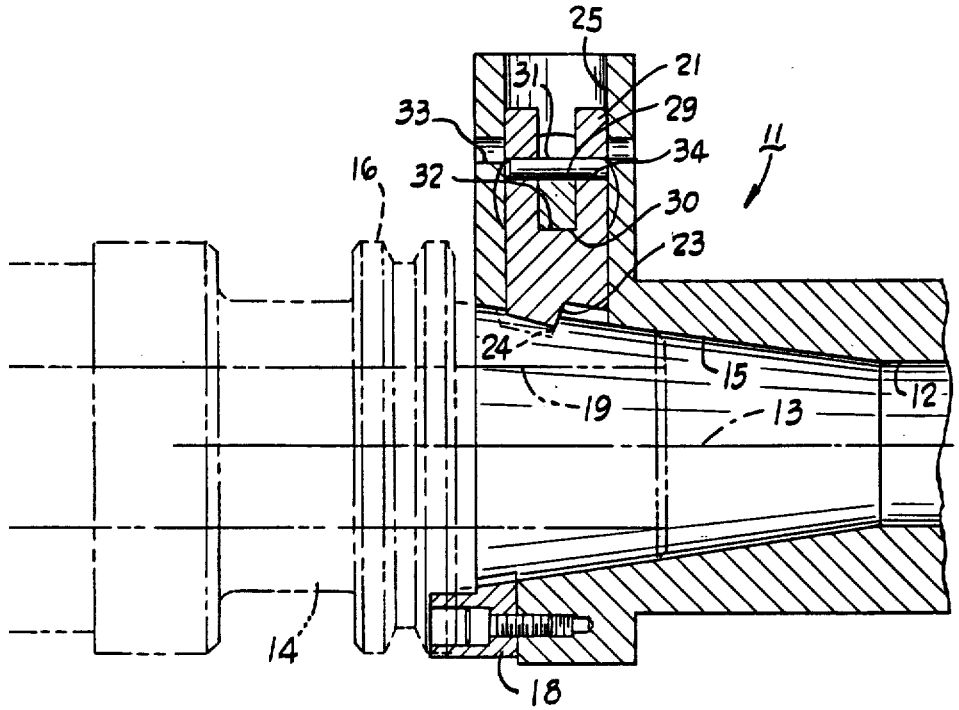

What is claimed is:

1. A locking tool holder for a rotatable spindle having a socket adapted to receive a tool having a lateral recess therein;

said locking tool holder comprising in combination:
a first aperture in the rotatable spindle tool socket extending transversely to the axis of the tool socket;
a lock pin movable in said first aperture;
said lock pin adapted to wedgingly cooperate with and be lockably complementary to the lateral recess on a tool in the tool socket;
a second aperture in said tool socket intersecting said first aperture transversely thereto;
a cam bar slidable in said second aperture;
first and second cam surfaces on said cam bar cooperable respectively with first and second cam follower surfaces carried on said lock pin;
said cam bar being movable in opposite directions in said second aperture into first and second positions;
movement of said cam bar to said first position acting through said second cam and follower surfaces and establishing said lock pin in wedging engagement with the lateral recess on a tool to lock the tool in the tool socket, and movement of said cam bar towards said second position causing said first cam surface to act on said first cam follower surface to force said lock pin transversely outwardly to unlock a tool in the tool socket;
first retention means including said first and second cam surfaces on said cam bar to wedgingly retain said lock pin in said first aperture;
second retention means to retain said cam bar in said second aperture; and
said second retention means including said first and second cam follower surfaces on said lock pin.

2. A locking tool holder as set forth in claim 1, wherein said lateral recess in a tool is a transverse tapering surface complementary to said lock pin to provide a positive locking wedge action with said cam bar in said first position.

3. A locking tool holder as set forth in claim 1, wrein said first and second retention means includes said first cam follower surface being removable from said lock pin to permit assembly and disassembly of said tool holder.

4. A locking tool holder as set forth in claim 1, wherein said first aperture extends substantially perpendicularly to the axis of said tool socket.

5. A locking tool holder as set forth in claim 4, wherein said second aperture extends substantially perpendicularly to said first aperture.

6. A locking tool holder as set forth in claim 1, wherein said cam bar is manually movable in opposite directions into said first and second positions.

7. A locking tool holder as set forth in claim 6, including spring means urging said cam bar toward said first position.

8. A locking tool holder as set forth in claim 1, wherein said tool socket aperture is a tapered aperture and said lateral recess is slightly tapered relative to a perpendicular to the axis of the tool socket.

9. A locking tool holder as set forth in claim 1, wherein said second aperture is substantially parallel to the tool socket axis.

10. A locking tool holder as set forth in claim 1, wherein said second aperture has an axis which lies in a plane normal to the axis of said tool socket.

11. A locking tool holder as set forth in claim 1, wherein said cam bar is generally cylindrical and has a given diameter to slide within a cylindrical second aperture, and said first and second retention means including said first and second cam followers on said lock pin having a distance therebetween less than said given diameter.

12. A locking tool holder as set forth in claim 1, wherein said first and second apertures are cylindrical and said lock pin and cam bar are cylindrical in cross section.

13. A locking tool holder as set forth in claim 12, wherein said cam surface is non-cylindrical and cooperates with said cam follower surface to prevent rotation of said lock pin.

* * * * *

UNITED STATES PATENT AND TRADEMARK OFFICE
CERTIFICATE OF CORRECTION

PATENT NO. : 4,710,077

DATED : Dec. 1, 1987

INVENTOR(S) : Valdas S. Ramunas

Page 1 of 2

It is certified that error appears in the above-identified patent and that said Letters Patent is hereby corrected as shown below:

Column 3, line 15 "1"
  should be --11--

Column 3, line 36 "this"
  should be --This--

Column 4, line 41 "the embodiment"
  should be --this embodiment--

Column 6, line 3 "whrein"
  should be --wherein--

The drawing figure shown on the first (informational) page is incorrect and is from a different patent entirely. Fig. 1 was selected from the drawings for printing in the Patent Office Official Gazette and this Fig. 1 should be displayed on this first (informational) sheet of the printed patent.

Signed and Sealed this

Nineteenth Day of April, 1988

Attest:

DONALD J. QUIGG

Attesting Officer

Commissioner of Patents and Trademarks

United States Patent [19]

Ramunas

[11] Patent Number: 4,710,077
[45] Date of Patent: Dec. 1, 1987

[54] LOCKING TOOL HOLDER
[75] Inventor: Valdas S. Ramunas, Euclid, Ohio
[73] Assignee: Erickson Tool Company, Solon, Ohio
[21] Appl. No.: 762,255
[22] Filed: Aug. 5, 1985
[51] Int. Cl.$^4$ .................................................. B23C 5/26
[52] U.S. Cl. .................................... 409/232; 279/79; 408/239 R
[58] Field of Search .................. 279/1 F, 76, 79, 87, 279/97, 1 DA, 1 TE, 86, 19.5; 408/238, 239 R, 714; 409/234, 231, 232; 29/568; 211/1.5

[56] References Cited
U.S. PATENT DOCUMENTS

| 2,107,581 | 2/1938 | Parsons et al. | 279/76 |
| 2,136,190 | 11/1938 | Gulfelt | 279/76 |
| 2,154,738 | 4/1939 | Fisher | 279/76 |
| 2,500,420 | 3/1950 | Koning | |
| 2,990,189 | 1/1961 | Beers | 279/76 |
| 3,091,474 | 5/1963 | Boutros et al. | 279/97 |
| 3,947,951 | 4/1976 | Jerue | 29/568 |

Primary Examiner—Z. R. Bilinsky
Attorney, Agent, or Firm—Pearne, Gordon, McCoy & Granger

[57] ABSTRACT

A locking tool holder is disclosed which has a socket adapted to receive a tool which has a lateral recess. The tool holder contains a lock pin which is slidable in a first aperture transverse to the tool socket, and this lock pin has a wedge portion on the inboard end thereof to engage a tapered lateral recess on the tool. A cam bar is slidable transversely to the lock pin in another aperture in the tool holder, and has first and second cam surfaces to cooperate with first and second cam followers on the lock pin. The cam bar may be moved manually or by a spring into a first locked position, whereat the second cam engages the second cam follower on the lock pin to force the lock pin wedge portion against the lateral recess in the tool. When the cam bar is moved into the second position, the first cam surface engages the first cam follower on the lock pin to withdraw the lock pin from the tool so that the tool may be removed from the tool socket. The foregoing abstract is merely a resume of one general application, is not a complete discussion of all principles of operation or applications, and is not to be construed as a limitation on the scope of the claimed subject matter.

13 Claims, 5 Drawing Figures